United States Patent [19]

Zwaga et al.

[11] Patent Number: 4,718,059

[45] Date of Patent: Jan. 5, 1988

[54] METHOD OF TRANSMITTING INFORMATION IN A DIGITAL TRANSMISSION SYSTEM

[75] Inventors: Bocke Zwaga; Hendrik J. Haveman, both of Hilversum, Netherlands

[73] Assignee: U.S. Philips Corporation, New York, N.Y.

[21] Appl. No.: 791,858

[22] Filed: Oct. 28, 1985

[30] Foreign Application Priority Data

Nov. 2, 1984 [NL] Netherlands ........................ 8403324

[51] Int. Cl.⁴ ............................................ H04J 3/02

[52] U.S. Cl. ........................................ 370/85; 370/95

[58] Field of Search ........................ 370/85, 79, 89, 95, 370/82, 94, 83, 84; 340/825.06, 825.07, 825.14

[56] References Cited

U.S. PATENT DOCUMENTS

| | | | |
|---|---|---|---|
| 3,591,722 | 7/1971 | Palsa | 370/82 |
| 3,862,370 | 1/1975 | Kadota | 370/82 |
| 3,959,595 | 5/1976 | Smith | 370/82 |

*Primary Examiner*—Robert L. Griffin
*Assistant Examiner*—Wellington Chin
*Attorney, Agent, or Firm*—Thomas A. Briody; Jack Oisher; William J. Streeter

[57] ABSTRACT

A method and apparatus for transmitting information from a number of transmitters to a receiver in a digital transmission system in time-division multiplex. So as to prevent to the greatest possible extent overlap of the information transmitted by the respective transmitters, the repetition rate of each transmitter is set in accordance with a unique identification number assigned to that transmitter. To keep the number of times each transmitter transmits as nearly equal as possible for all transmitters, each transmitter includes a circuit for generating inhibit signals which prevent transmission, the inhibit signals being generated more frequently in transmitters having shorter repetition intervals. The circuit can be realized using only digital circuits which can be implemented in a single IC.

6 Claims, 3 Drawing Figures

METHOD OF TRANSMITTING INFORMATION IN A DIGITAL TRANSMISSION SYSTEM

BACKGROUND OF THE INVENTION

1. Field of the Invention

The invention relates to a method of transmitting information in a digital transmission system, the transmission system comprising one of more transmitter arrangements and a receiver coupled thereto, each transmitter arrangement generating time intervals of a given duration, time slots which can contain the information transmitted in time-division multiplex to the receiver having been provided within the time intervals.

The invention further relates to a transmitter arrangement for performing the method.

2. Description of the Related Art

Such a method and transmitter arrangement are described in an article by J. Huber and A. Shah, entitled "Simple asynchronous multiplex system for unidirectional low-data-rate transmission", published in IEEE, Transactions on communications, June 1975, pages 675–679. In this article a time-division multiplex system is described in which transmitter arrangements are coupled to a receiver via a transmission medium. The transmitter arrangements are arranged to transmit information to the receiver at a given repetition rate, which depends on the duration of the time intervals. When the duration of the time intervals is identical for each of the transmitter arrangements, randomly mutually overlapping information will remain periodically overlapping. See page 675 of the above-mentioned article. This periodical overlap can be eliminated by having the transmitter arrangements generate time repetition intervals of mutually appropriately different durations. A problem then encountered is that the number of times information is transmitted to the receiver differs for each transmitter arrangement, so that one transmitter arrangement is given an advantage over the other.

SUMMARY OF THE INVENTION

The invention has for its object to equalize the average number of times each transmitter arrangement can transmit information to the receiver.

According to the invention, the method is characterized in that the durations of the time repetition intervals are chosen in dependence on a unique identification number assigned to each transmitter arrangement, that each transmitter arrangement generates an inhibit signal for preventing information from being transmitted to the receiver, that the inhibit signal is derived from the relative duration of the time repetition intervals of each transmitter arrangement, the inhibit signal being generated more frequently as the duration of the time repetition intervals becomes shorter; for keeping the average probability of occurrence of a possibility of transmitting substantially equal for each of the transmitter arrangements.

It is a further object of the invention to provide a method of transmitting information, time repetition intervals having durations which are different for each transmitter arrangement being generated by the transmitter arrangements such that the circuits required therefore can be implemented in one IC.

The method according to the invention is characterized in that the duration of the time repetition intervals is chosen in accordance with the elements of an arithmetical progression.

The method provides the possibility of realization using only digital circuits, it being moreover possible to implement all these circuits in one IC.

A further advantage of the method is that the use of a noise generator with which in said article a stochastic distribution of the duration of the time intervals is realized can be omitted. A simple-to-realize method is characterized in that the durations of the time intervals are related to each other in accordance with the elements of an arithmetical progression.

The transmitter arrangement for performing the method is therefore characterized in that the transmitter arrangement comprises a time repetition generating interval circuit, an inhibiting circuit for generating an inhibit signal, and a transmission suppression circuit for preventing under the control of the inhibit signal the transmission of information to the receiver.

BRIEF DESCRIPTION OF THE DRAWINGS

The invention will now be described in greater detail by way of example with reference to the accompanying drawing, in which corresponding components are given the same reference numerals. Therein.

DESCRIPTION OF THE PREFERRED EMBODIMENTS

Figure 1:
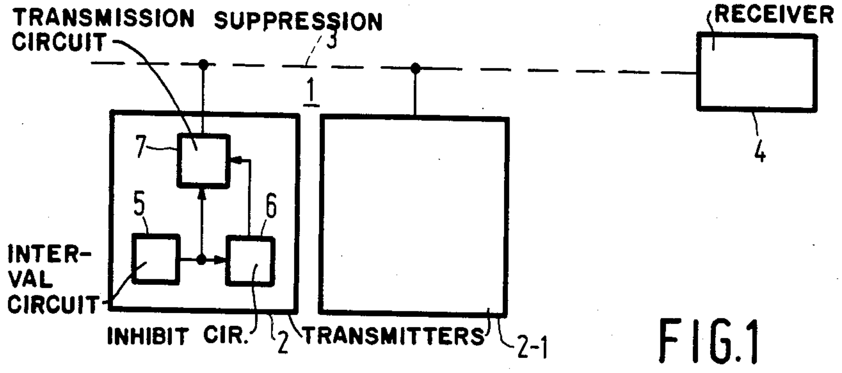
FIG. 1 shows a transmission system in which a schematic illustration of an embodiment of a transmitter arrangement according to the invention is included.

FIG. 1 shows a digital transmission system 1. The transmission system 1 generally comprises a plurality of transmitter arrangements 2, 2-1, 2-2 etc., this Figure showing two of these arrangements, namely 2 and 2-1. In addition, the transmission system 1 comprises a transmission medium 3, which is connected to these transmitter arrangements 2, 2-1, 2-2, 2-i, and is represented by a broken line, and a receiver 4 connected to the transmission medium 3. For the sake of simplicity, the transmitter arrangement 2 will be described hereinafter, the description and arrangement of the other transmitter arrangements 2-1, 2-2, 2-i corresponding to those of the transmitter arrangement 2. Such a transmission system 1 is inter alia used in telemetry systems, in alarm systems or, for example, for error locating purposes. In the transmission system 1, each of the transmitter arrangements 2 can transmit, independently of each other, messages in the form of digital information in time-division multiplex to the receiver 4 via the transmission medium 3. The messages transmitted by each transmitter arrangement 2 comprise an identification portion and a data portion. The identification portion comprises data required by the receiver 4 for detecting the identity of the relevant transmitter arrangement 2 which transmitted the messages. The data portion may inter alia comprise measuring data or data on the state of the transmitter arrangement 2. The overall message length of the information transmitted by the transmitter arrangement 2 need however not be constant, but may depend on the type of information to be transmitted. The transmission medium 3 may be, for example, free space or a material medium, such as a glass fibre or a conductor structure. The transmission medium 3 needs only to be capable of conducting the digital information in one direction, namely from each of the transmitter arrangements 2 to the receiver 4.

Each transmitter arrangement 2 comprises a time repetition interval generating circuit 5. The interval circuit 5 generates time intervals, for example by means of a trigger signal or a control signal. Time slots which can contain the digital information are provided at these intervals. In addition, the transmitter arrangement 2 comprises an inhibiting circuit 6 connected to the interval circuit 5, for generating an inhibit signal.

The transmitter arrangement 2 further comprises a transmission suppression circuit 7 connected to the interval circuit 5 and to the inhibiting circuit 6. The transmission suppression circuit 7 is arranged to fill or not fill the time slots with information, under the control of the inhibiting signal. It thus becomes possible to prevent information from being transmitted, so as to influence the probability of a transmission occurring.

When the duration of the time intervals is equal for each of the transmitter arrangements 2, 2-1, 2-i each such transmitter arrangement transmits an equal number of times and none of the transmitter arrangements 2 is preferred. If then however a transmitter arrangement 2 transmits a message which is wholly or partly overlapped by one or more other messages, these messages are not only mutilated, but continue to be regularly mutilated. For this reason the time intervals generated by different ones of the transmitter arrangements 2, 2-1, 2-i, are given different durations. The duration is chosen in dependence on a unique identification number assigned to each transmitter arrangement 2, for which more specifically the address of the transmitter arrangement 2 can be used. This has the advantage that generally the duration of the time intervals can be determined in a simple way from the identification number of the relevant transmitter arrangement 2, so that it becomes possible to realise a transmitter arrangement 2 which can be assembled solely from digital circuits, such as, for example, counters, multipliers and dividers, which circuits can all be implemented in one IC.

As the durations of the time intervals generated by each transmitter arrangement 2 have been chosen to be different, one transmitter arrangement 2 will transmit more frequently than another one. This is generally not desirable. Consequently, the inhibiting circuit 6 is arranged for comparing the durations of the time intervals to a time interval of the longest duration. This comparison results in production of a difference signal by inhibit circuit 6 which represents the relative duration of the generated time intervals. The inhibit signal is thereafter derived from this difference signal. Comparing these intervals is effected such that as the duration of the time intervals becomes shorter the resultant difference signal becomes greater. Thus the inhibit signal is produced more frequently as the duration of the time intervals is shorter, so as to keep the average probability of transmission equal for each of the transmitter arrangements 2. It is however not necessary to compare the intervals generated by each transmitter arrangement with the same time interval of the longest duration. If so desired, the transmitter arrangements 2 can be divided into priority classes, one time interval of the longest duration being available for selection within a priority class, this time interval of the longest duration differing from the longest time interval in all the other priority classes. Depending on the priority of the class of transmitter arrangements 2 it is possible to give one class the advantage over the other by the choice of the time interval of the longest duration.

A time interval of the longest duration need not necessarily be associated with a given transmitter arrangement 2, the time interval of the longest duration may be associated with a fictitious transmitter arrangement 2.

Figure 2:
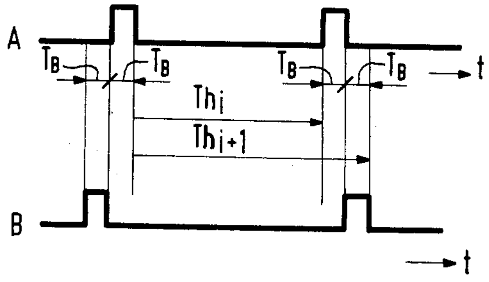
FIG. 2 shows two time diagrams A and B to illustrate a situation in which messages just do not overlap.

It is preferable for the durations of the time intervals generated by the different transmitter arrangements 2 to be sufficiently different so that an overlap will be lost by the subsequent interval. All this is illustrated in detail in two time diagrams A and B in FIG. 2. The time t is plotted along the two axes. Two time slots are provided on each axis, each slot having a given message period $T_B$. The duration of the time intervals of the transmitter arrangement 2 having identification number i is denoted by $Th_i$ in time diagram A, and the duration of the time intervals of the next transmitter arrangement 2 having identification number i+1 is denoted by $Th_{i+1}$ in time diagram B. The Figure illustrates an extreme situation in which the messages originating from the transmitter arrangements 2 having the addresses i and i+1 just fail to overlap. It will be obvious from the Figure that the difference of the time intervals $Th_{i+1}-Th_i$ between any pair of transmitter arrangements 2 must be at least twice the message period $T_B$, to ensure that a subsequent overlap will be lost by the next interval.

Figure 3:
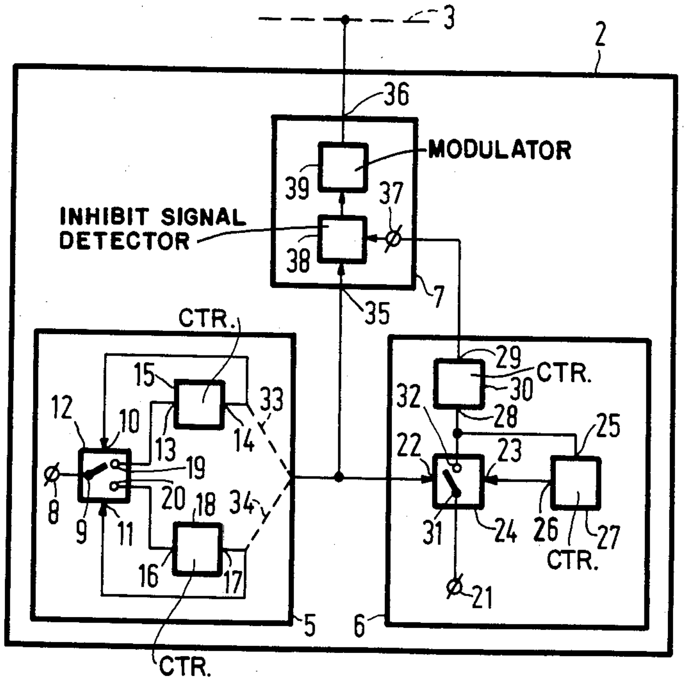
FIG. 3 shows a more detailed embodiment of a transmitter arrangement of FIG. 1.

FIG. 3 shows in more detail an embodiment of a transmitter arrangement 2 of FIG. 1. The transmitter arrangement 2 is connected to the transmission medium 3 which is shown in that by means of a broken line. The transmitter arrangement 2 comprises the repetition interval generating circuit 5, the inhibiting circuit 6 and the transmission suppression circuit 7. The interval circuit 5 has a terminal 8 for connecting a first clock pulse generator, not shown. The clock pulse generator produces a pulse-shaped signal with a frequency f, which signal is, for example, obtained from a quartz crystal. The interval circuit 5 comprises an electronic change-over switch 12 having a master contact 9 and two control inputs 10, 11, a first adjustable counter 15 having an input 13 and an output 14, and a second adjustable counter 18 having an input 16 and an output 17. A first contact 19 of the change-over switch 12 is connected to the input 13 of the first counter 15. The pulses produced by the clock pulse generator reach the input 13 of the first counter 15 via the terminal 8 and the contacts 9 and 19. The first, adjustable counter 15 is of such a structure that after a number of pulses corresponding to the adjusted value have been counted a control signal, for example a pulse, is supplied from the output 14, whereafter the counter 15 is reset. The second counter 18, and also third and fourth counters still further to be described, are of a similar structure. The output 14 of the counter 15 is connected to the control input 10 of the change-over switch 12. After the first counter 15 has counted a number of pulses corresponding to the adjusted value it applies a control signal to the control input 10. The change-over switch 12 is of such a structure that in response to the control signal applied to control input 10, the change-over switch 12 changes state. After the change-over switch 12 has changed state, the pulses present at the terminal 8 are applied to the input 16 of the second counter 18 via the contact 20. After the number of pulses corresponding to the value to which the second counter 18 has been set has been reached, it supplies a control signal from its output 17. This control signal, which is applied to the control input 11 via the output 17 causes the change-over switch 12 to change to the position shown in the Figure, whereafter the above-described cycle is repeated. Thus, a periodic control signal is available at each of the counter outputs 14 and 17. Let the adjusted value of one of the counters 15, 18 be I, i.e. a period of time which is the same for each transmitter arrangement 2, and the adjusted value of the other counter be iS, S being the difference time and i a unique identification number, which in the further course of the description represents the address of the transmitter arrangement 2. Then the duration $Th_i$ of the time repetition intervals of the periodic control signal of the transmitter arrangement 2 having address i can be written:

$$Th_i = c(I + iS), \text{ (I, S both integers)} \quad (1)$$

wherein c is a constant which depends on the clock frequency f of the first clock pulse generator. Herein cI, being the repetition rate of the transmitter arrangement having address O, can be interpreted as a maximum of the time which can be used to transmit the information to the receiver 4.

For the interval circuit 5 of the above-described structure, both i and S can be set separately. The interval circuit 5 can, however, alternatively be realized by one modulo-counter. The inhibiting circuit 6 has a terminal 21 for the connection of a second clock pulse generator, not shown. This clock pulse generator produces a pulse-shaped signal with a frequency Kf, where K is an integer exceeding 1, which signal may be obtained from a crystal. The inhibiting circuit 6 comprises an electronic single-pole switch 24 having two control inputs 22, 23 a third adjustable counter 27 having an input 25 and an output 26, and a fourth adjustable counter 30 having an input 28 and an output 29. One of the contacts 31, 32 of the switch 24 in FIG. 3 contact 31 is connected to the terminal 21. The control input 22 is connected, in a way which is partly illustrated by means of a broken line, to either the output 14 via the dot-and-dash portion 33, or to the output 17 via the dot-and-dash portion 34. The other one of the contacts 31, 32, in FIG. 3 contact 32, is connected to the input 25 of the third counter 27 and to the input 28 of the fourth counter 30. The output 26 of the fourth counter 27 is connected to the control input 23 of the switch 24.

The switch 24 is of such a structure that it closes as soon as the control signal from counter 27 arrives at the control input 22. In response thereto the pulses produced by the second clock pulse generator are counted by the counters 27, 30. The third counter 27 is set to a value equal to $K(i_{max}-i)$, wherein K is an integral constant still to be determined and $i_{max}$ represents the maximum value of all the addresses of transmitter arrangements 2 belonging to the same above-mentioned priority class. As a result thereof a longest time interval $Th_{i_{max}}$ of the transmitter arrangement 2 having address $i_{max}$ is compared to the time interval $Th_i$ of the transmitter arrangement 2 having address i, causing the above-mentioned representation of the difference signal to be generated by counter 27 and to become available at output 26. The switch 24 is of such a structure that it opens as soon as the control signal constituted by the difference signal is supplied to its control input 23.

The fourth counter 30 is adjusted to a value equal to $K(I/S+i_{max})$. After switch 24 has opened for the first time, counter 30 has counted to $K(i_{max}-i)$, which is not yet sufficient to generate an inhibit signal at output 29; so that the transmitting of information in a relevant time interval will not be prevented. In the subsequent time interval the counter 27 will again count to $K(i_{max}-i)$, whereafter switch 24 opens for the second time. There are now two possibilities as regards the counter 30, namely $2K(i_{max}-i)$ is less than the adjusted value $K(I/S+i_{max})$ of the fourth counter 30 or $2K(i_{max}-i)$ is greater than or equal to the adjusted value of the fourth counter 30. In the first case the content of counter 30 will be increased in a subsequent time interval to $3K(i_{max}-i)$ etc. until at a given instant the second case occurs and an inhibit signal in the form of a control signal at output 29 is generated by the inhibiting circuit 6. Thereafter counter 30 is reset, this counter being capable of resuming counting immediately thereafter.

The transmission suppression circuit 7 has an input 35 connected to the control input 22 of the switch 24, an output 36 connected as shown by means of a dot-and-dash line to the transmission medium 3, and furthermore has a terminal 37 connected to the output 29 of the counter 30. The transmission suppression circuit 7 comprises circuit means 38 connected to the input 35 and to the terminal 37 and coupled to the output 36 of the transmission suppressing circuit 7, which circuit means, after having detected an inhibit signal at terminal 37 prevents information from being transmitted. If no inhibit signal is detected, the transmission is not prevented and the information is further enconveyed to the output 36, via further means 39, which may, for example, be implemented for modulating the information.

It is easy to see from equation (1) that if I/S is an integer, periodic overlap of information transmitted by different transmitter arrangements 2 occurs. So as to keep these overlaps to a minimum, the least common denominator of the duration $Th_i$ of the time intervals of any pair of transmitter arrangements 2 must be as high as possible. Generally, I/S will not be an integer. The fourth counter 30 is however set to a value $K(I/S+i_{max})$, which must be an integral value. By giving the constant K a predetermined integral value, $K(I/S+i_{max})$ can now still become an integer.

A further cause of periodic overlap occurs when one transmitter arrangement 2 has an integral number of times the duration $Th_i$ of another transmitter arrangement 2. In order to prevent this form of overlap from occurring, the constraint:

$$2Th_{i_{min}} - Th_{i_{max}} > cS \quad (2)$$

must be satisfied.

Let it be assumed, for the sake of simplicity, that each transmitter arrangement 2 utilizes the transmit possibility given to it, then equation (2) expresses together with equation (1) that between two consecutive instants at which the transmitter arrangement 2 having address $i_{max}$ transmits, there are not more than two consecutive instants at which the transmitter arrangement 2 having address i sends, it holding that $i_{max} > i > i_{min}$.

When the constraint of equation (2), which constraint is not absolutely necessary has been satisfied, the number of times, $N_t$, that an inhibit signal is generated will be inversely proportional to the probability P that between two consecutive instants at which the transmitter arrangement 2 having address $i_{max}$ transmits there are two consecutive instants at which the transmitter arrangement 2 having address i transmits, where $i_{max} > i > i_{min}$. For this probability it is easy to derive that $$P = \frac{Th_{imax} - Th_i}{Th_{imax}} = \frac{i_{max} - i}{\frac{I}{S} + i_{max}} = \frac{1}{N_t} \quad (3)$$

For each transmitter arrangement 2 the average duration $Th_i$ of the time intervals is thus kept equal to:

$$Th_i = Th_{imax} = c(I + i_{max}S), \text{ for } i_{max} > i > i_{min} \quad (4)$$

By setting $i_{max}$, which setting is proportional to the time interval of the longest duration, this desired average duration can be set.

The embodiment described has the advantage that the transmitter arrangements 2 are simple to realize and in addition may be of identical structure.

What is claimed is:

1. A method of transmitting information in time division multiplex in a digital transmission system which comprises a plurality of transmitters and a receiver; each transmitter generating, at time repetition intervals of a given duration, time slots for information to be transmitted in time-division multiplex to the receiver; such method being characterized in that: the duration of the time repetition intervals for each transmitter is set in accordance with a unique identification number assigned to such transmitter; each transmitter generates inhibit signals for preventing transmission of information to the receiver in time slots during such inhibit signals, such inhibit signals being derived from the relative durations of the time repetition intervals of the respective transmitters; and the inhibit signals are generated more frequently in transmitters having shorter time repetition intervals, thereby keeping the average probability of transmission of information by each transmitter substantially equal for all of the transmitters.

2. A method as claimed in claim 1, wherein the durations of the time repetition intervals of respective transmitters are related to each other in accordance with an arithmetical progression.

3. A transmitter for use in a digital transmission system for performing a method as claimed in claim 1 or 2, such transmitter comprising: an interval circuit for generating the time repetition intervals of the transmitter; an inhibiting circuit for generating the inhibit signals; and a transmission suppression circuit which under the control of the inhibit signals prevents transmission of information to the receiver in time slots during the inhibit signals.

4. A transmitter as claimed in claim 3, characterized in that:

said interval circuit comprises:

an electronic change-over switch having two control inputs, two outputs and a master terminal for receiving clock pulses; and first and second adjustable counters each having an input and an output, the outputs of said change-over switch being respectively connected to the inputs of said counters, and the control inputs of said change-over switch being respectively connected to the outputs of said counters;

at least one of said counters producing a control signal at its output upon reaching a count corresponding to a unique identification number assigned to the transmitter;

and said inhibiting circuit comprises:

an electronic single-pole switch having a master terminal for receiving clock pulses, two control inputs and an output; and third and fourth adjustable counters each having an input and an output, the inputs thereof being connected to the output of said single-pole switch, the output of the third counter being connected to a first control input of the single-pole switch, and the second control input of the single-pole switch being connected to the output of one of the first and second counters in said interval circuit;

the third counter producing a control signal at its output upon reaching a count corresponding to the identification number of said transmitter, and the fourth counter producing an inhibit signal at its output upon reaching a count to which the fourth counter has been set corresponding to a preselected longest duration of the time repetition interval of said transmitter.

5. A transmitter as claimed in claim 3, wherein said interval circuit comprises an electronic change-over switch controlled by a pair of counters for generating the time repetition intervals of the transmitter.

6. A digital transmission system comprising a plurality of transmitters as claimed in claim 3, wherein the durations of the time repetition intervals of such transmitters are related to each other in accordance with an arithmetic progression.

* * * * *